Patented Feb. 24, 1953

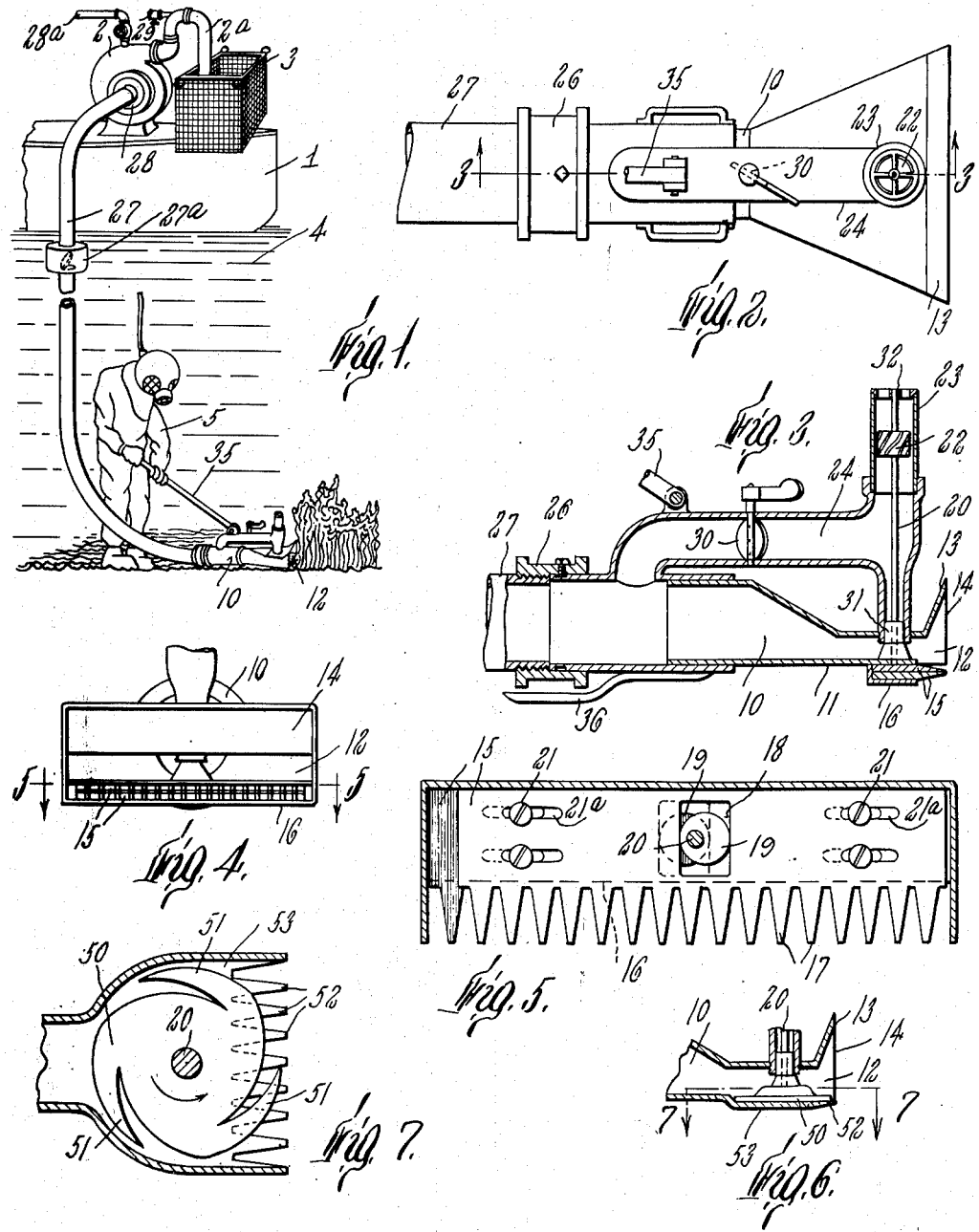

2,629,218

UNITED STATES PATENT OFFICE 2,629,218

MARINE HARVESTER WITH CONVEYER

John P. Smith, Weymouth, Mass.

Application July 27, 1948, Serial No. 40,908

4 Claims. (Cl. 56—9)

This invention relates to the harvesting of marine vegetation, and more particularly Irish moss or "carrageen."

It has for one object to provide a more economical method and apparatus than heretofore practiced or used. A further object is to cut the moss rather than tear it from its support, thus to avoid injury so that its growth may be replenished more quickly.

Still another object is to provide mechanism by which the moss is cut and conveyed out of the water by simple power operated means.

Further objects and advantages will appear from a description of certain apparatus shown in the accompanying drawings in which Figure 1 is a perspective view illustrating the manner of use of a harvester mechanism employing the subject matter of this invention.

Figure 2 is a top plan view to a larger scale of a portion of the mechanism shown in Figure 1.

Figure 3 is a detail sectional view on line 3—3 of Figure 2.

Figure 4 is a front elevation of the mechanism of Figures 2 and 3.

Figure 5 is a detail sectional view to a larger scale on line 5—5 of Figure 4.

Figure 6 is a view similar to a portion of Figure 3 but showing a modification.

Figure 7 is a detail sectional view to a larger scale on line 7—7 of Figure 6.

Referring to Figure 1, at 1 is shown a mobile vessel of any suitable description carrying a centrifugal pump 2 of a type sometimes called a "trash pump" and with suitable mechanism (not shown) for driving it. The discharge from this pump takes place through a suitable air trap 2a into a separator 3, shown as a strainer, which is supported in elevated position above the surface of the water 4 upon which the vessel 1 is floated.

This vessel 1 also carries suitable diver surface equipment (not shown) so that a diver at 5 may descend to the floor of the ocean where he may manipulate the moss harvesting mechanism. This mechanism, as shown best in Figures 2 and 3, comprises a conduit 10 provided with a flat base 11 and having a forward open end 12. As shown the upper wall of the conduit adjacent to this end flares upwardly as at 13 to form with the sides and base 11 a substantially rectangular mouth portion 14. Adjacent to the forward end of this conduit is positioned means for freeing the moss from its bed or support comprising moss cutting mechanism. As shown in Figures 3, 4 and 5, this may comprise a pair of elongated blades 15 suitably mounted beneath and adjacent to the mouth 14, and reciprocable in opposite directions. Both blades may be provided with forwardly extending cutting teeth or prongs 17. The blades are arranged to be moved by power, and for this purpose each may be provided with a slot 18 (see Figure 5) within which is positioned an eccentric 19 carried by an upright rotary shaft 20. The eccentrics are positioned with their axes 180° apart. By rotation of this shaft 20, which provides a wabbling motion to the eccentrics 19, it will be evident that the blades are reciprocated back and forth in opposite directions. Screws 21 passing through slots 21a in the movable blades and threaded into a stationary plate 16 act as guides to restrict the movable blades to the desired reciprocatory motion. The shaft 20 may be rotated by power by a suitable means. In Figure 3 it is shown as carrying a fluid current operated means, for example, a screw impeller 22 mounted within an upright casing 23 connected at its lower end, as through a pipe 24, with the interior of the conduit 10 between its ends. The rear end of the conduit 10 is coupled as by a coupling 26 to the lower end of a non-collapsible hose 27 which extends up to the intake 28 of the trash pump 2. The bore 27 may have incorporated therein below the water level, an upwardly opening flap valve 27a, and the pump should be provided with a priming connection 28a leading to the discharge from a suction pump, and an air vent valve 29, these parts facilitating starting of the trash pump into operation. It will thus be seen that when the trash pump is in operation, a current of water is sucked through the conduit 10 from its open end, carrying with it vegetation which may be cut from adjacent to its base by the cutting mechanism, the vegetation being swept upwardly above the surface of the water through the conduit and the hose 27 by the rush of water passing through the conduit and being discharged into the separator 3 from which the water drains away while the cut material is retained.

The cross sectional areas of the conduit 10 and the pipe 24 and casing 23 are preferably somewhat less than that of the hose 27 so that a portion of the water which passes up the hose 27 is obtained from the interior of the pipe 24, this being drawn past the impeller 22 which is thus rotated by power, thus to drive the moss cutting mechanism adjacent to the forward end of the conduit. A manually operated valve 30 may be interposed in the pipe 24, by the adjustment of which the amount of water being drawn through the pipe 24 may be regulated as desired with consequent regulation of the speed of rotation of the impeller 22. The shaft 20 which supports this impeller is journaled in suitable bearings as at 31 and 32 positioned therealong, but so formed as to offer minimum obstruction to flow of water past the impeller.

This cutting and suction mechanism may be provided with a suitable handle, such as that shown at 35, by which the movement of the mechanism along the ocean floor under the guidance and control of the diver may be facilitated. A suitable support 36 on the under side of the mechanism may be employed to facilitate moving the cutting and discharge mechanism along the ocean floor.

Since a diver can readily see the vegetation on the ocean floor in his immediate neighborhood during the day time, or if desired strong lights can be thrown downwardly through the water as a further aid, the diver is able to ascertain where the desired vegetation which he wishes to harvest is positioned, and as he presents the cutting mechanism thereto, it cuts off the vegetation near to its base but without injury thereto so that the deposit is in excellent condition to replenish itself by further growth in a minimum period of time.

Instead of employing a fluid current motor for driving the cutting mechanism, other power means may be employed, such as an electric motor shown at 40 on Figure 8. Such a motor must be thoroughly enclosed and protected from the water as by means of an enclosing casing 41, and its armature 42 may be integral with or coupled to the cutter shaft 20. Suitable leads connecting the motor through a water tight cable 43 extend up into the vessel 1 where suitable motor controls are attached.

While Figures 3 and 5 show a reciprocable cutting blade, any other suitable cutting means may be provided. For example, as shown in Figures 6 and 7, a rotary cutter 50 having hook cutting portions 51 may be carried by the shaft 20, this rotary cutting blade cooperating with a stationary blade 53, and provided with a series of teeth 52 with which cooperate the cutting edges of the cutter portions 51. This rotary cutter may be actuated by power means as may be desired, as by a fluid current motor as shown in Figure 3.

With mechanism as herein shown the harvesting may be done very rapidly and without damage to the roots of the vegetation, and the separation of the water therefrom is conveniently accomplished by the sieve 3.

The vegetation is thus cut or freed from its bed or support and swept upwardly by the current of water produced by the rotation of the trash pump 28, and the vegetation is then freed from the major portion of the water with which it was associated by the straining action of the separator 3.

From the foregoing description of the novel method of this invention and certain apparatus particularly suitable for carrying it out, it should be evident to those skilled in the art that various further changes and modifications might be made without departing from its spirit or scope.

I claim:

1. A marine vegetation harvesting machine comprising a conduit having an open forward end, vegetation cutting means located adjacent to the lower portion of said open end, a pump having its intake connected to the rear end of said conduit to establish current flow through said conduit carrying with it material cut by said cutting means, a pipe entering said conduit back of said open end through which water is drawn by said pump, fluid current operated means in said pipe in position to be operated by the passage of water through said pipe, and driving connections between said fluid current operated means and said cutting means.

2. A marine vegetation harvesting machine comprising a conduit having an open forward end, vegetation cutting means located adjacent to the lower portion of said open end, a pump having its intake connected to the rear end of said conduit to establish current flow through said conduit carrying with it material cut by said cutting means, a pipe entering said conduit back of said open end and through which water is drawn by said pump, a screw impeller in said pipe in position to be rotated by the passage of water through said pipe, and driving connections between said screw impeller and cutting means.

3. A marine vegetation harvesting machine comprising a conduit having an open forward end, vegetation cutting means comprising substantially horizontal relatively movable blades positioned adjacent to the base of said open end and carried by said conduit, an upright movable blade actuating shaft connected to move said blades relatively as it is rotated, a current flow motor in driving relation to said shaft, the discharge from said motor entering said conduit and means operatively connected thereto for establishing a current of water rearwardly through said motor and conduit in position to sweep the material cut by said cutting means thereinto and thus remove the vegetation from its original position.

4. A marine vegetation harvesting machine comprising a conduit having an open forward end, vegetation cutting means comprising substantially horizontal relatively movable blades positioned adjacent to the base of said open end and carried by said conduit, an upright movable blade actuating shaft connected to move said blades relatively as it is rotated, a current actuated impeller carried by said shaft, a casing for said impeller, a pipe leading from said casing to said conduit back of said open end and through which water may be drawn to thereby rotate said impeller and drive said cutting means, a pump connected to the rear end of said conduit for drawing water and cut vegetation therethrough and water through said pipe and casing, and means operatively connected thereto for receiving the discharge from said pump.

JOHN P. SMITH.

REFERENCES CITED

The following references are of record in the file of this patent:

UNITED STATES PATENTS

| Number | Name | Date |
| --- | --- | --- |
| 1,388,414 | Dros | Aug. 23, 1921 |
| 1,571,395 | Clark | Feb. 2, 1926 |
| 2,181,863 | Bell | Dec. 5, 1939 |
| 2,204,584 | Flower | June 18, 1940 |
| 2,320,283 | Knowlton et al. | May 25, 1943 |